US012352427B2

(12) United States Patent
Wang et al.

(10) Patent No.: US 12,352,427 B2
(45) Date of Patent: Jul. 8, 2025

(54) LENS FOR LED LIGHT SOURCE, AND PROJECTION LAMP WITH SAME

(71) Applicant: ZhongShan RaySense Electronics Co., Ltd, Zhongshan (CN)

(72) Inventors: Gang Wang, Zhongshan (CN); Ligao Xiong, Zhongshan (CN); Shaoqi Ji, Zhongshan (CN)

(73) Assignee: ZhongShan RaySense Electronics Co., Ltd., ZhongShan (CN)

( * ) Notice: Subject to any disclaimer, the term of this patent is extended or adjusted under 35 U.S.C. 154(b) by 0 days.

(21) Appl. No.: 18/125,127

(22) Filed: Mar. 23, 2023

(65) Prior Publication Data

US 2024/0263761 A1 Aug. 8, 2024

(51) Int. Cl.
*F21V 5/04* (2006.01)
*F21V 7/04* (2006.01)

(52) U.S. Cl.
CPC .............. *F21V 5/048* (2013.01); *F21V 7/048* (2013.01)

(58) Field of Classification Search
CPC ........... F21V 5/048; F21V 7/048; F21S 41/25
See application file for complete search history.

(56) References Cited

U.S. PATENT DOCUMENTS

2003/0156417 A1* 8/2003 Gasquet .................... F21V 5/04 362/329
2020/0393741 A1* 12/2020 Nanda ................ G02B 19/0061

* cited by examiner

*Primary Examiner* — Sean P Gramling
(74) *Attorney, Agent, or Firm* — Jose Cherson Weissbrot

(57) ABSTRACT

Disclosed is a novel lens for an LED light source, and a projection lamp with the same. The lens includes a reflection portion and a divergence portion. A light source is refracted by the reflection portion and then projected to the divergence portion, by which a light beam is then diverged out. The divergence portion has a flat surface side and a concave surface side, and the reflection portion is arranged on the flat surface side. The utility model has the following beneficial effects: the structure is exquisite, by using a new structural design for a focus lens, the light beam of the LED light source is reflected and refracted multiple times in the lens and then diverged, which solves the problem of large area of the LED light source, and at the same time, after being re-focused, the light beam is suitable for forming higher-brightness white light.

4 Claims, 3 Drawing Sheets

LENS FOR LED LIGHT SOURCE, AND PROJECTION LAMP WITH SAME

TECHNICAL FIELD

The utility model relates to the technical field of lamps for creating atmospheres, in particular to a novel lens for an LED light source, and a projection lamp with the same.

BACKGROUND

With the development of society, people's requirements for living standards are getting higher and higher, and more and more people strive for the quality of life. For example, people began to pay attention to illumination lamps, but the current illumination lamps on the market only have the function of illumination, and are single in light elements, which leads to monotonous lighting atmospheres, making users easily suffer from visual and aesthetic fatigue.

In addition, with the improvement of people's quality of life, more requirements are put forward for the lighting atmospheres, and illumination lamps with monotonous light are far from meeting people's needs. Thus, people began to pay attention to illumination lamps that can create wonderful lighting atmospheres. Accordingly, lamps that can create a variety of wonderful lighting atmospheres have appeared on the market to meet the needs of consumers.

However, for example, commercially available starry sky projection lamps usually use laser light sources, but rarely use LED light sources. The reason is that as for the LED light sources, due to the insufficient brightness of green LEDs, the overall brightness of the LED light sources should not be too high. Whereas, the white light in the starry sky projection lamps is formed by the laser light sources using a blue laser generator in cooperation with fluorescent powder. Therefore, the problem of green limited brightness in the LED light sources is avoided. However, although the brightness of the laser light source is high, the cost is increased accordingly. Therefore, the development of a starry sky projection lamp that can use the LED light sources becomes one of the difficulties.

SUMMARY

In view of the defects in the prior art, the utility model aims to provide a novel lens for an LED light source, and a projection lamp with the same.

In order to achieve the above objective, the utility model adopts the following technical solutions.

The utility model first provides a novel lens for an LED light source. The lens includes a light directing portion; and a divergence portion. A light is refracted and reflected by the light directing portion and then projected to the divergence portion, by which a light beam is then diverged out. The divergence portion has a flat surface side and a concave surface side, and the light directing portion is arranged on the flat surface side.

It should be noted that the light directing portion includes a reflection group, a first refraction group, and a second refraction group. The reflection group is arranged on the flat surface side of the divergence portion, and defined by a plurality of reflection surfaces. The first refraction group is arranged on the top inner side surface of the reflection group defined by the plurality of reflection surfaces, and composed of a plurality of first refraction surfaces. The second refraction group is composed of a second refraction surface.

It should be noted that one ends of the plurality of first refraction surfaces extend along the top inner side surface. The second refraction surface being arranged in an area formed by one ends of the plurality of first refraction surfaces. Light is reflected by the plurality of reflection surfaces. Thereafter, the light is refracted by the plurality of first refraction surfaces and subsequently refracted by the second refraction surface, and then converged on the divergence portion.

It should be noted that there are included angles between the plurality of reflection surfaces.

It should be noted that there are included angles between the plurality of first refraction surfaces.

It should be noted that the reflection group is located in the middle of the flat surface side.

It should be noted that the plurality of reflection surfaces are inclined.

It should be noted that the plurality of first refraction surfaces are inclined.

Also provided is a projection lamp with a novel lens for an LED light source. The projection lamp includes a light source, a lens, a first reflection mirror, a focus lens and a second reflection mirror which are sequentially arranged. The lens includes a light directing portion and a divergence portion. Light from the light source is reflected and refracted by the light directing portion and then projected to the divergence portion, by which a light beam is then diverged out. The divergence portion has a flat surface side and a concave surface side, and the light directing portion is arranged on the flat surface side.

It should be noted that the light source is an LED light source. A light beam emitted by the LED light source is diverged by the lens and then reflected from the first reflection mirror onto the focus lens, then the focused light is directed to the second reflection mirror, and finally, countless dots and other patterns are reflected through the second reflection mirror.

The utility model has the beneficial effects that the structure is exquisite, by using a new structural design for a lens, the light beam of the LED light source is reflected and refracted multiple times in the lens and then diverged, which solves the problem of large area of the LED light source. At the same time, after being re-focused, the light beam is suitable for forming higher-brightness white light. Further, the structure is applicable to a starry sky projection lamp or projection lamps with other patterns. For example, in the starry sky projection lamp, star spots having the same brightness as a laser light source can be formed, while the effect is not reduced, and the production cost is reduced.

DETAILED DESCRIPTION

The utility model will be further described below in conjunction with accompanying drawings. It should be noted that on the premise of the technical solutions, detailed implementations and specific operation processes are given in embodiments, but the scope of protection of the utility model is not limited to the embodiments.

Figure 1:
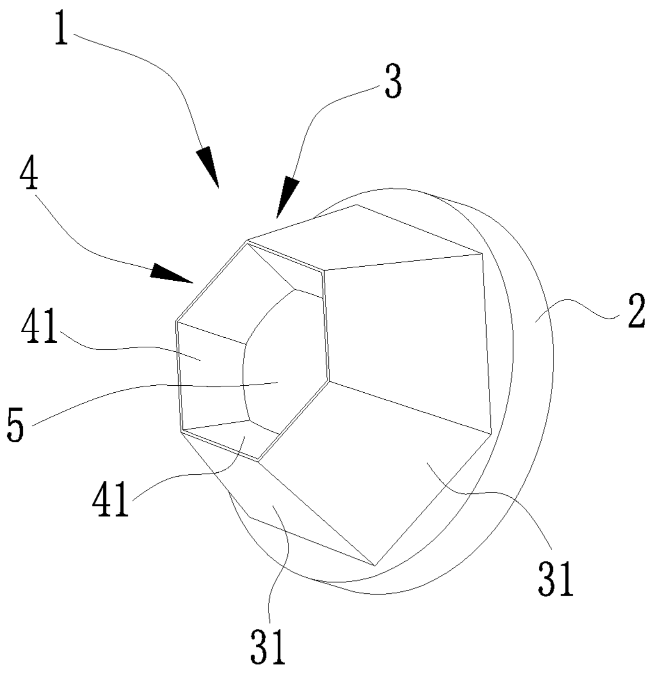
FIG. 1 is a schematic structural diagram of the utility model.
Figure 2:
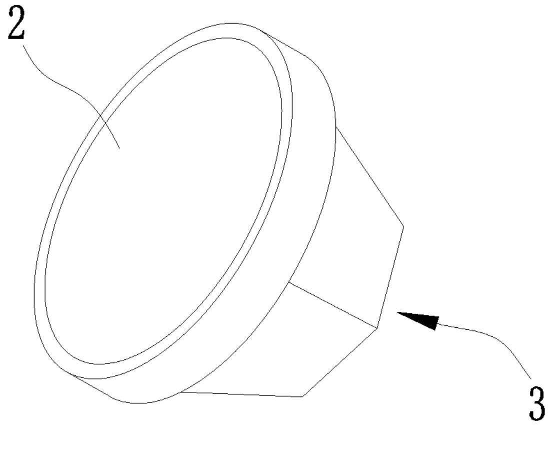
FIG. 2 is a schematic structural diagram from another perspective in FIG. 1.
Figure 3:
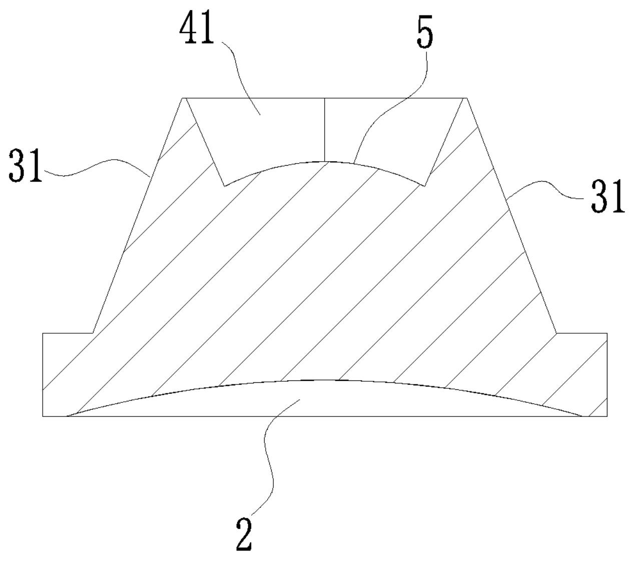
FIG. 3 is a schematic structural diagram of a section of a lens of the utility model.

As shown in FIG. 1, FIG. 2 and FIG. 3, the utility model relates to a novel lens for an LED light source. The lens includes a light directing portion 1 and a divergence portion 2. Light from the light source is reflected and refracted by the light directing portion 1 and projected to the divergence portion 2, by which a light beam is then diverged out. The divergence portion 2 has a flat surface side and a concave surface side, and the light directing portion 1 is arranged on the flat surface side.

It should be noted that in the utility model, the light source is an LED light source.

Further, as shown in FIG. 1, FIG. 2 and FIG. 3, in the utility model, the light directing portion 1 includes a reflection group 3 and a refraction group 4. The reflection group 3 is arranged on the flat surface side of the divergence portion 2, and defined by a plurality of reflection surfaces 31. The refraction group 4 is arranged on the top inner side surface of the reflection group defined by the plurality of reflection surfaces, and composed of a plurality of first refraction surfaces 41.

As a preferred technical solution, the reflection group 3 and the divergence portion 2 may be integrally formed or formed by close connection of 2 independent components.

Further, as shown in FIG. 1 and FIG. 3, in the utility model, one ends of the plurality of first refraction surfaces 41 extend along the top inner side surface. A second refraction surface 5 is further provided. The second refraction surface 5 is arranged in an area formed by one ends of the plurality of first refraction surfaces 41. Light is reflected by the plurality of reflection surfaces 31. Thereafter, the light is refracted by the plurality of first refraction surfaces 41 and subsequently refracted by the second refraction surface 5, and then converged on the divergence portion 2.

As a preferred technical solution, the shape defined by the plurality of reflection surfaces is regular polygon, in which the number of the reflection surfaces is not less than 3. Furthermore, the number of the first refraction surfaces should be the same as that of the reflection surfaces.

Further, in the utility model, there are included angles between the plurality of reflection surfaces.

Further, in the utility model, there are included angles between the plurality of first refraction surfaces.

Further, in the utility model, the reflection group is located in the middle of the flat surface side.

It should be noted that in the utility model, the divergence portion has a concave surface side.

Further, in the utility model, the plurality of reflection surfaces are inclined.

Further, in the utility model, the plurality of first refraction surfaces are inclined.

Figure 4:
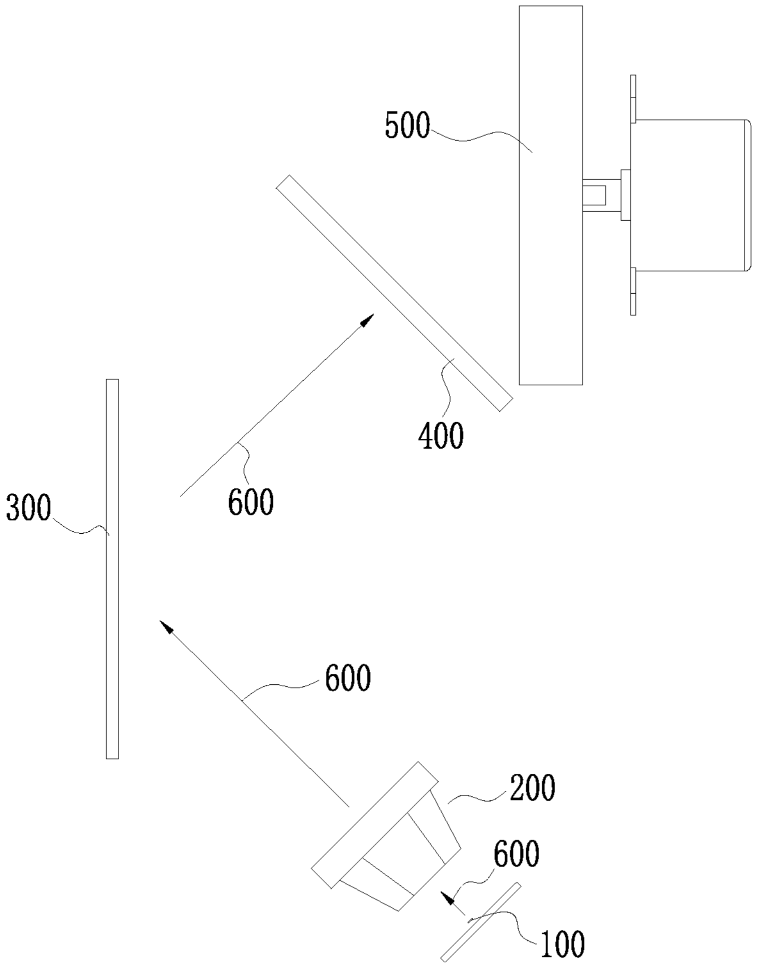
FIG. 4 is a schematic diagram of a light path of an LED light source projection lamp with the lens of the utility model.

Also provided is a starry sky projection lamp with a novel lens for an LED light source. As shown in FIG. 4, the projection lamp includes a light source 100, a lens 200, a first reflection mirror 300, a focus lens 400 and a second reflection mirror 500 which are sequentially arranged. The lens includes a light directing portion and a divergence portion. The light from the light source is reflected and refracted by the light directing portion and then projected to the divergence portion, by which a light beam is then diverged out. The divergence portion has a flat surface side and a concave surface side, and the light directing portion is arranged on the flat surface side.

Figure 5:
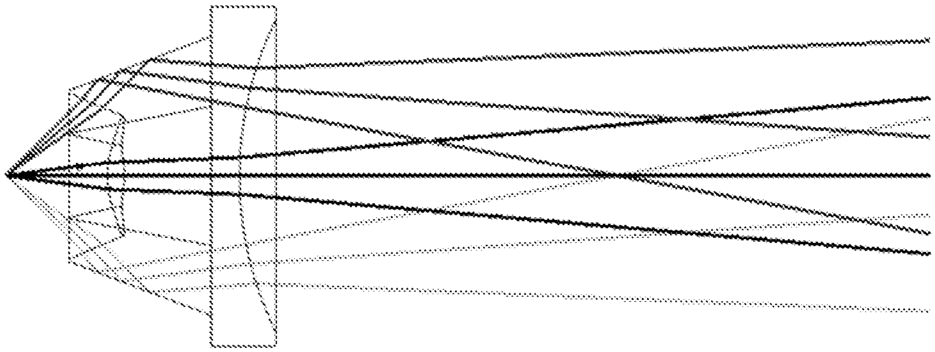
FIG. 5 is a schematic diagram of a light path of the lens of the utility model.

Further, as shown in FIG. 5, in the utility model, the light source is an LED light source. A light beam 600 emitted by the LED light source is focused by the lens 200 and then reflected from the first reflection mirror 300 onto the focus lens 400. The focused light is directed to the second reflection mirror 500. Finally, countless dots and other patterns are reflected through the second reflection mirror.

It should be noted that the second reflection mirror may be a single mirror or may be composed of a plurality of reflection mirrors.

As a preferred technical solution, the second reflection mirror is also connected with a stepping motor, such that it is possible to select a rotary or static state according to different projection needs. That is, when the stepping motor drives the second reflection mirror to rotate, a plurality of white dots projected by the light beam emitted from the LED light source sequentially passing through the lens, the first reflection mirror, the focus lens and the second reflection mirror will follow. When the stepping motor stops rotating, the plurality of white dots are stationary and maintained at designated positions, forming the starry effect.

Of course, the starry sky mentioned above is only an example, and the patterns in the utility model may be changed according to different needs.

Embodiment 1

After a light beam of an LED light source entering a lens of the utility model, the light beam may be reflected and refracted. When part of the light beam enters a plurality of first refraction surfaces, refraction occurs. The light beam may be directly refracted into a second refraction surface via any one of the first refraction surfaces, then enter a reflection group through the second refraction surface, is then reflected into a divergence portion via any one of reflection surfaces of the reflection group, and is finally diverged out through a concave surface of the divergence portion. The light beam may also be refracted by the plurality of first refraction surfaces, then enter the second refraction surface, is reflected into the divergence portion by any one of the reflection surfaces, and is finally diverged out through the concave surface of the divergence portion. The light beam may also directly enter the refraction portion, then enter the divergence portion, and is finally diverged out through the concave surface of the divergence portion. However, regardless of the way the light beam enters and exits the utility model, the purpose is to improve the effect of the LED light source.

Embodiment 2

When a projection lamp with the above lens, a light beam is emitted from an LED light source into a lens. After being focused, the light beam is converged on a first reflection mirror and then reflected from the first reflection mirror to the focus lens. After being focused, the light beam is reflected to a second reflection mirror. Finally, different patterns, such as the starry sky pattern described above, are projected through the second reflection mirror.

For those skilled in the art, various other corresponding changes and variations can be made in accordance with the technical solutions and ideas described above, and all these changes and variations should fall within the scope of protection of the claims of the present disclosure.

What is claimed is:

1. A novel lens for an LED light source, comprising:

a light directing portion including a reflection group, a first refraction group, and a second refraction group, the reflection group composed of a plurality of reflection surfaces, the first refraction group composed of a plurality of first refraction surfaces, and the second refraction group composed of a second refraction surface; and a divergence portion;

wherein the LED light source is refracted and reflected by the light directing portion, and then projected to the divergence portion, by which a light beam from the LED light source is diverged out;

wherein a shape defined by the plurality of reflection surfaces and a shape defined by the plurality of first refraction surfaces is regular polygon and a number of the plurality of reflection surfaces is similar to a number of the plurality of first refraction surfaces;

wherein each refraction surface of the plurality of first refraction surfaces extends along atop inner side surface of the reflection group, and the second refraction surface is arranged in an area enclosed by the plurality of first refraction surfaces;

wherein the divergence portion has a flat surface side and a concave surface side, and the light directing portion extends from the flat surface side;

wherein the reflection group is arranged on the flat surface side of the divergence portion, wherein a first reflection surface of the plurality of reflection surfaces is at an angle with respect to a second reflection surface of the plurality of reflection surfaces, and wherein the first reflection surface is adjacent to the second reflection surface; and wherein the plurality of first refraction surfaces is inclined, wherein a first refraction surface of the plurality of first refraction surfaces is at an angle with respect to a second refraction surface of the plurality of refraction surfaces, and wherein the first refraction surface is adjacent to the second refraction surface.

2. The novel lens for the LED light source according to claim 1, wherein the reflection group is located in the middle of the flat surface side.

3. A projection lamp, comprising:

an LED light source;

at least one lens;

a first reflection mirror;

a focus lens; and a second reflection mirror which are sequentially arranged;

wherein the at least one lens comprises, a light directing portion, and a divergence portion, the LED light source being refracted and reflected by the light directing portion, and then projected to the divergence portion, by which a light beam from the LED light source is then diverged out, wherein the divergence portion has a flat surface side and a concave surface side, and the light directing portion is arranged on the flat surface side, wherein the light directing portion comprises a reflection group and a refraction group, wherein the reflection group is arranged on the flat surface side of the divergence portion, and defined by a plurality of reflection surfaces, wherein a reflection surface of the plurality of reflection surfaces is at an angle with respect to an adjacent reflection surface of the plurality of reflection surfaces; and wherein the refraction group is arranged on a top inner side surface of the reflection group defined by the plurality of reflection surfaces, and composed of a plurality of first refraction surfaces, wherein the plurality of first refraction surfaces is inclined, and wherein a refraction surface of the plurality of first refraction surfaces is at an angle with respect to an adjacent refraction surface of the plurality of reflection surfaces.

4. The projection lamp according to claim 3, wherein the light beam emitted by the LED light source is diverged through the at least one lens, and then reflected from the first reflection mirror onto the focus lens, then the focused light is directed to the second reflection mirror, and finally, countless dots and other patterns are reflected through the second reflection mirror.

* * * * *